No. 669,373. Patented Mar. 5, 1901.
G. E. STEIN.
VEHICLE AXLE NUT.
(Application filed July 5, 1900.)
(No Model.)
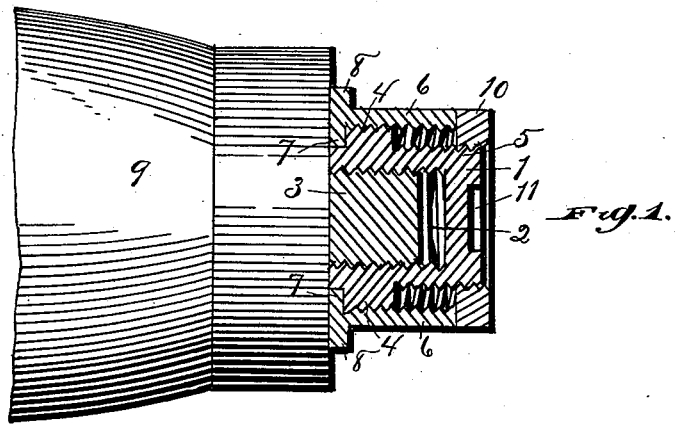
Fig. 1.
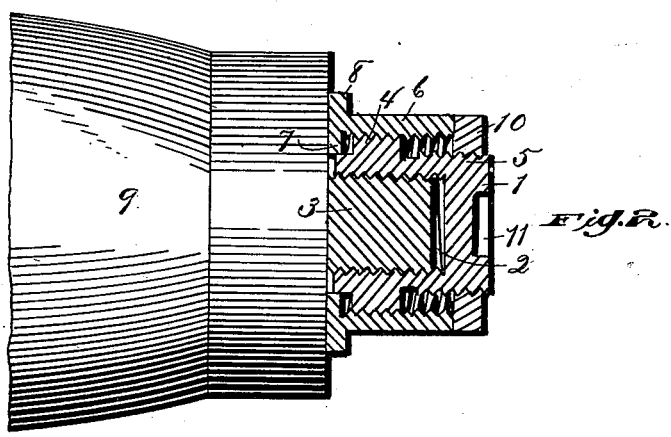
Fig. 2.
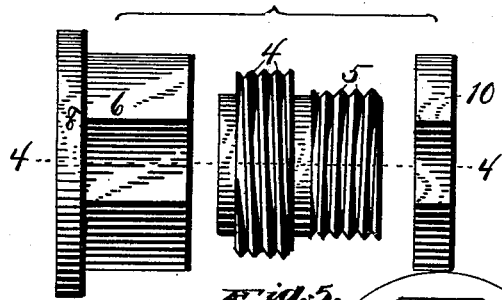
Fig. 3. Fig. 5.
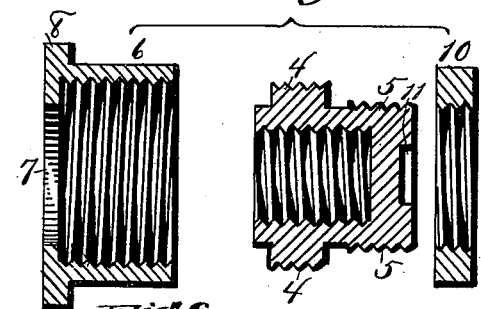
Fig. 4. Fig. 6.
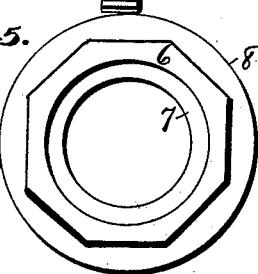
Witnesses:
J. P. Appleman
Elliot Mitchell
Inventor
Geo. Edw. Stein.
By H. E. Dunlap,
Atty.

UNITED STATES PATENT OFFICE.

GEORGE EDWARD STEIN, OF WHEELING, WEST VIRGINIA.

VEHICLE-AXLE NUT.

SPECIFICATION forming part of Letters Patent No. 669,373, dated March 5, 1901.

Application filed July 5, 1900. Serial No. 22,483. (No model.)

*To all whom it may concern:*

Be it known that I, GEORGE EDWARD STEIN, a citizen of the United States of America, and a resident of Wheeling, county of Ohio, and State of West Virginia, have invented certain new and useful Improvements in Vehicle-Axle Nuts, of which the following is a specification.

My invention relates to vehicle-axle nuts, and more particularly to that class of vehicle-axle nuts commonly termed "take-up" nuts; and it consists in the particular construction and arrangement of parts which will hereinafter be fully described, and pointed out in the appended claims.

With the nuts which are in common use at the present time after a vehicle has been in use for a short time the axles and wheels become so worn that a space is left between the nut and the shoulder of the hub and rendering it necessary to fill up said space with washers formed of leather or like material. These washers prove more or less effective for a short time upon a light vehicle, but when applied to a heavy vehicle are ineffective, since they are easily and quickly worn out or so pressed out of shape as to render them useless.

The object of my invention is to provide a device of the character described which may be adjusted upon a vehicle-axle, so as to render the application of washers unnecessary; and with this object in view my invention consists of an interiorly-screw-threaded sleeve or bushing in the form of a cap-nut adapted to be fitted on the threaded end of the axle-spindle. This sleeve or bushing is also provided with oppositely-threaded portions of unequal diameter on its exterior. On the inner threaded portion is screwed a nut or shell having a terminal flange adapted to abut against the boxing and shoulder of the hub, and on the outer threaded portion is screwed a second nut adapted to rest against and to lock the first-mentioned nut to hold the nut and bushing in relative adjustment.

In describing my invention in detail reference is had to the accompanying drawings, in which—

Figure 1 is a transverse sectional view of my invention applied to a new and unworn axle. Fig. 2 is a similar view of the same applied to an axle which is slightly worn. Fig. 3 is a side elevation of my invention, showing the parts thereof detached. Fig. 4 is a transverse sectional view of the same on the line 4 4 of Fig. 3. Fig. 5 is a front elevation of the inner nut or shell. Fig. 6 is a similar view of the sleeve or bushing.

Referring to the drawings, in which similar reference-numerals designate like parts, 1 is the sleeve or bushing in the form of a cap-nut, which is provided with interior screw-threads 2, adapted to fit the threaded end of an axle-spindle 3. On the exterior of said sleeve or bushing are two screw-threaded portions of different diameters, one of which is provided with right-hand screw-threads and the other with left-hand screw-threads. The inner screw-threaded portion 4 has a greater diameter than the portion 5.

6 is a nut or shell the inner end of which has an integral interior flange or collar 7, the interior diameter of which is the same as that of the smooth part of the axle-spindle and adapted to rest against the boxing in the hub 9. Said nut 6 also has an external flange or collar 8 on its inner end adapted to rest against the shoulder of the hub 9. This nut 6 is adjustable upon the inner threaded portion of the sleeve or bushing 1.

10 is a locking-nut adjustable upon the outer threaded end of said sleeve or bushing 1 and adapted to lock the nut 6 to hold the nut and bushing in relative adjustment.

It will be observed that the threads provided on the inner portion 4 of the bushing run in the same direction as those provided on the end of the axle-spindle. The object of this is to so arrange it that when the wheel turns in a forward direction the nut 6 will tend to follow it, and will thus be kept tight against the hub-shoulder and will also bind or lock itself against the locking-nut 10, provided on the outer threaded portion 5.

As is obvious, when my device is applied to a new and unworn axle the sleeve or bushing 1 is adjusted so that its inner end or face will be flush with the inner face of the nut 6, and the locking-nut 10 is screwed up against said nut 6 to hold it in position, and when the axle or wheel becomes worn, so as to render a take up necessary, the locking-nut 10 is removed or loosened, and the nut 6 is adjusted on the bushing to fill up the intervening space when the locking-nut is tightened against it.

Having thus described my invention, what I claim as new, and desire to secure by Letters Patent, is—

1. In combination with a vehicle-axle, a bushing interiorly screw-threaded to fit the threaded end of the axle-spindle, two exterior threaded portions of different diameters on said bushing, one of said exterior threaded portions provided with right-hand threads and the other with left-hand threads, a nut or shell provided with internal and external flanges on its inner end, said nut or shell adapted to be adjusted on the inner exteriorly-threaded portion of the bushing, and a locking-nut adapted to be adjusted on the outer exteriorly-threaded portion of the bushing against the first-mentioned nut to hold said nut and the bushing in relative adjustment, substantially as and for the purposes set forth and described.

2. A vehicle-axle nut consisting of a cap-bushing having an interiorly-threaded socket to fit the threaded end of an axle-spindle, a cavity or groove on the outer end of said bushing, two threaded portions of unequal diameter on the exterior surface of said bushing, one of which is provided with right-hand screw-threads and the other with left-hand screw-threads, a nut fitted to the inner exteriorly-threaded portion, said nut provided with an internal terminal flange the interior diameter of which is the same as that of the smooth part of the axle-spindle, and an external terminal flange, said flanges adapted to rest against the boxing and shoulder of the hub, a locking-nut fitted to the outer exteriorly-threaded portion of said bushing and adapted to be adjusted to hold the bushing and nut in adjusted position, substantially as described.

3. A take-up nut for vehicle-axles, comprising a bushing in the form of a cap-nut having an interior screw-thread to fit the threaded end of an axle-spindle, two screw-threaded portions of different diameters on the exterior surface of said bushing, one of which is provided with right-hand screw-threads and the other with left-hand screw-threads, a nut adjustable on the inner screw-threaded portion of the exterior surface, an internal and an external terminal flange on the inner end of said nut, the interior diameter of the internal flange being the same as that of the smooth part of the axle-spindle, and a locking-nut adjustable on the outer screw-threaded portion of the exterior surface of the bushing to hold the bushing and nut in relative adjustment, substantially as described.

Signed by me at Wheeling, West Virginia, this 21st day of May, 1900.

GEORGE EDWARD STEIN.

Witnesses:
GEORGE T. ORNOLD,
WM. JOHNSTON.